No. 653,136. Patented July 3, 1900.
A. DAMBACHER.
IMPLEMENT FOR DIGGING AND GATHERING POTATOES.
(Application filed May 26, 1899.)
(No Model.) 3 Sheets—Sheet 1.

No. 653,136. Patented July 3, 1900.
A. DAMBACHER.
IMPLEMENT FOR DIGGING AND GATHERING POTATOES.
(Application filed May 26, 1899.)
(No Model.) 3 Sheets—Sheet 2.

No. 653,136. Patented July 3, 1900.
A. DAMBACHER.
IMPLEMENT FOR DIGGING AND GATHERING POTATOES.
(Application filed May 26, 1899.)

(No Model.) 3 Sheets—Sheet 3.

Witnesses
H. Schloss
Bruno Robra.

Inventor
Anton Dambacher
by his Attorneys

UNITED STATES PATENT OFFICE.

ANTON DAMBACHER, OF MUNICH, GERMANY.

IMPLEMENT FOR DIGGING AND GATHERING POTATOES.

SPECIFICATION forming part of Letters Patent No. 653,136, dated July 3, 1900.

Application filed May 26, 1899. Serial No. 718,397. (No model.)

*To all whom it may concern:*

Be it known that I, ANTON DAMBACHER, a subject of the King of Würtemberg, residing at Munich, in the Kingdom of Bavaria, in the German Empire, have invented new and useful Improvements in Implements for Digging and Gathering Potatoes, of which the following is a specification.

The subject of the present invention is an implement for digging and gathering potatoes after the plants have been removed by the cutter.

The essential feature of the invention is the peculiar construction and arrangement of a digger or lifter-wheel which digs up the complete rows of potatoes—that is, lifts up the soil, together with the potatoes lying in it, and throws it upon a sieve. This sieve is constructed only of longitudinal staves, through which an elevator-rake passes. The tubers are here sorted from the soil and after being passed under a roller-brush are conducted to a collector-box at the rear part of the implement.

The accompanying drawings illustrate one form of construction of the new implement.

Figure 1:
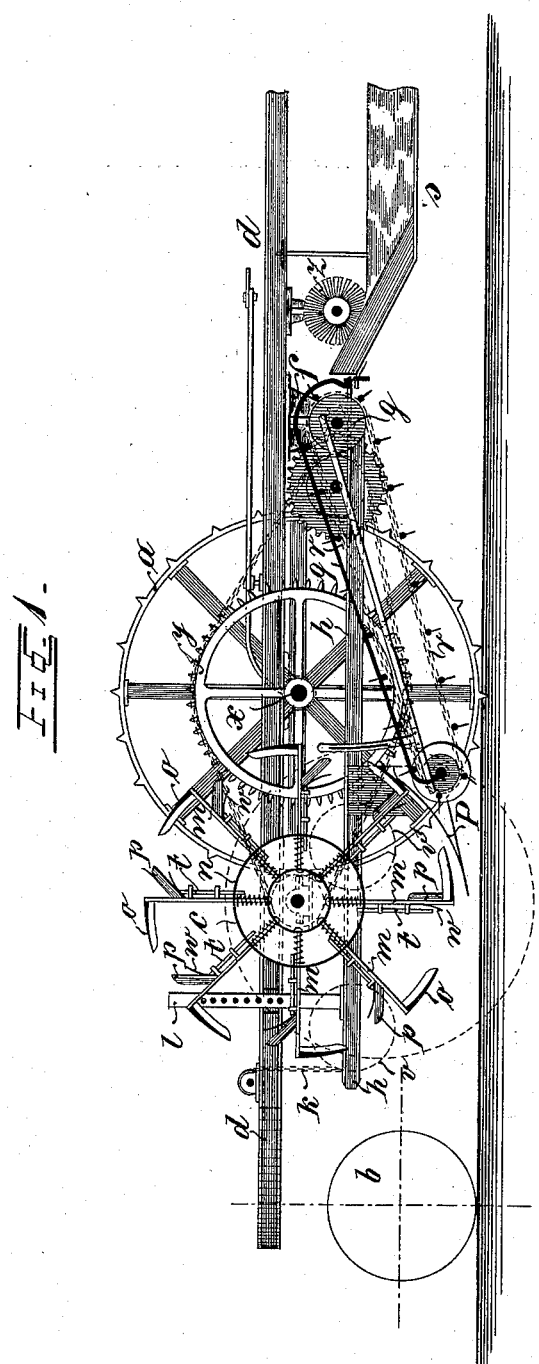
Figure 2:
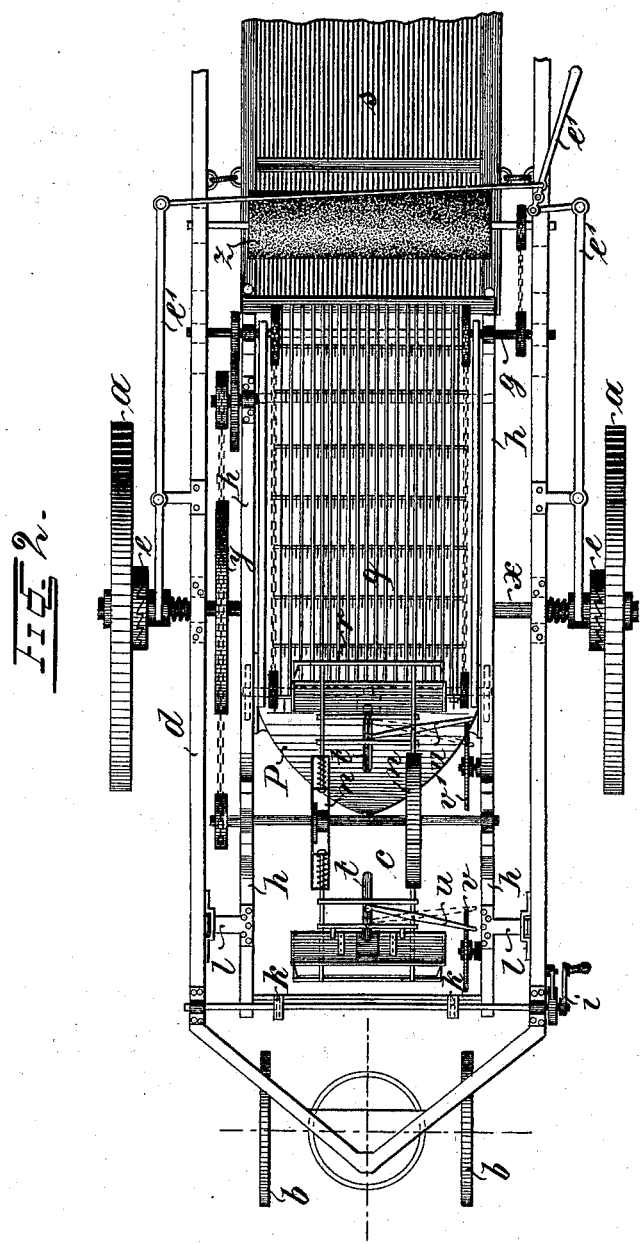
Figure 3:
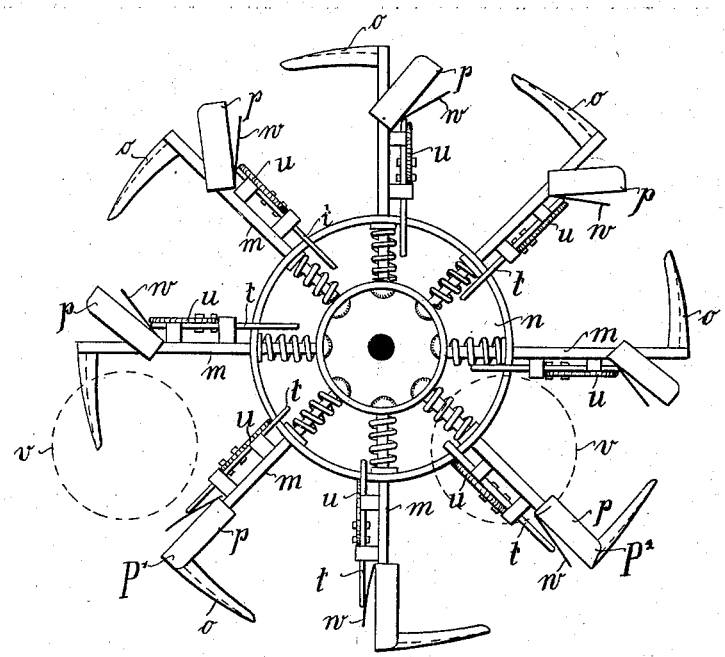
Figure 4:
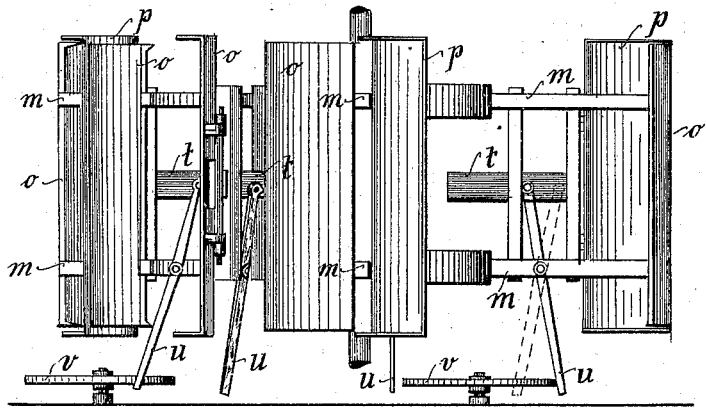

Figure 1 is a vertical section, and Fig. 2 a plan view. Fig. 3 is a side elevation of the digger or lifter-wheel drawn to an enlarged scale. Fig. 4 is a plan view of this wheel, one of the wings being omitted to better show the construction.

The whole implement is arranged on a framework $d$, which is carried by the axis of the two running and transport wheels $a$ and is steered by the front wheels $b$. The lifter-wheel $c$ is mounted so as to rotate between the two longitudinal bars $h$. These latter are connected to the framework $d$ by means of the hanger-brackets $f$ and axle $g$ in such manner that the front end of the bars $h$ can be raised or lowered, as desired, by means of a locking-crank $i$ and chains $k$. In this manner the lifter-wheel $c$ can be given any desired vertical position during the work or may be raised into the position shown in Fig. 1 when the machine is to be transported. $l\,l$ are two guide and adjustment posts, by means of which the position of bars $h$ with lifter-wheel $c$ relatively to the framework $d$ may be controlled. The lifter-wheel $c$ has eight double arms $m$, Figs. 3 and 4, provided with springs adjustably arranged so as to slide in the cases $n$. The wheel $c$ is thus given a certain amount of elasticity when working. The double arms $m$ carry the hoes or lifters $o$, which raise the soil containing the tubers, and the flaps $p$, which open and close during work. These flaps close just before entering the soil and open again shortly after leaving it, allowing then both soil and tubers to drop upon the sieve $q$. Here the elevator-rakes $r$ separate the tubers from the soil and conduct them under a roller-brush $z$ to the collector-box $s$.
The opening and closing of each flap $p$ is effected by means of a slide $t$ and lever $u$. The latter strikes against the roller-disks $v$, and in passing them is operated so as to first open and then close the flap. For the sake of clearness of the drawings the disks $v$ are shown by dotted lines in Fig. 1, and in Fig. 2 only the two horizontal arms for opening and closing the flaps are shown. The flaps close while passing from the horizontal position to the vertical down position of the arms $m$ and open on moving upward again to the horizontal position. In Fig. 3 the flap $P'$ is shown as just closed, while the flap $P^2$ is just commencing to open. In order that the opening may not take place too suddenly and in order to better distribute the soil lifted up, spring sheet-metal plates $w$ are provided behind the flaps $p$, against which plates the slides $t$ abut. The spiral springs arranged around the double arms $m$ inside the cases $n$ are for the purpose of imparting elasticity to the arms and lifters, so that they may not rigidly oppose any large obstacle, such as stones or the like.
The implement is driven by means of the chain-wheel $y$, mounted on the axle $x$, Figs. 1 and 2, which transmits the motion both to the lifter-wheel and to the elevator-rakes. Above the collector-box $s$ is the roller-brush $z$, which removes any soil that may be clinging to the potatoes.

When the machine is to be transported, the whole mechanism is brought out of action by disengaging the clutch $e$, Fig. 2, by means of the lever $e'$, and the lifter-wheel, as already mentioned, raised by means of the adjustment-posts $l\,l$.

In order to facilitate the work of the lifter-wheel and elevator, it will be found advantageous to provide a plowshare P between the lifter-wheel and the elevator, as shown in Fig. 1.

Having now described my invention, what I claim as new, and desire to secure by Letters Patent, is—

1. An implement for digging and gathering potatoes, comprising a framework mounted on wheels, a potato lifter-wheel $c$, capable of being raised and lowered, mounted on an axle, gearing for driving said axle from the main axle, means for releasing such gearing from operation, the said lifter-wheel consisting of central cases $n$, spring-arms $m$ and peripheral lifters $o$, slides $t$, hinged flaps $p$ and levers $u$, disks $v$, a collector $s$, and means for conveying the potatoes from the lifter-wheel to said collector, all substantially as described.

2. An implement for digging and gathering potatoes, comprising a framework $d$, mounted on wheels, a frame $h$, suspension means $i\ k$ for said frame, guide and adjustment means $l$, a potato lifter-wheel $c$ mounted on an axle carried by said frame $h$, gearing for driving said axle from the main axle, said lifter-wheel consisting of central cases $n$, spring-arms $m$ and peripheral lifters $o$, slides $t$, hinged flaps $p$ and levers $u$, disks $v$ mounted on said frame $h$, a sieve $q$ and elevator rake on said device $r$, a roller-brush $z$ mounted on said framework $d$, a collector-box $s$, gearing for driving said devices $r\ z$ from the main axle, and suitable mechanism $e\ e'$ for disengaging said gearing from the traveling wheels $a$, substantially as described.

3. In an implement for digging and gathering potatoes, a lifter-wheel $c$, comprising central cases $n$, spring-arms $m$ and peripheral lifters $o$, slides $t$, hinged flaps $p$ and levers $u$, all substantially as and for the purposes hereinbefore set forth.

In testimony whereof I have signed this specification in the presence of two subscribing witnesses.

ANTON DAMBACHER.

Witnesses:
  EMIL HENZEL,
  FRANZ HEPP.